(No Model.) 2 Sheets—Sheet 2.
B. F. RIX.
FERTILIZER DISTRIBUTER.
No. 488,680. Patented Dec. 27, 1892.
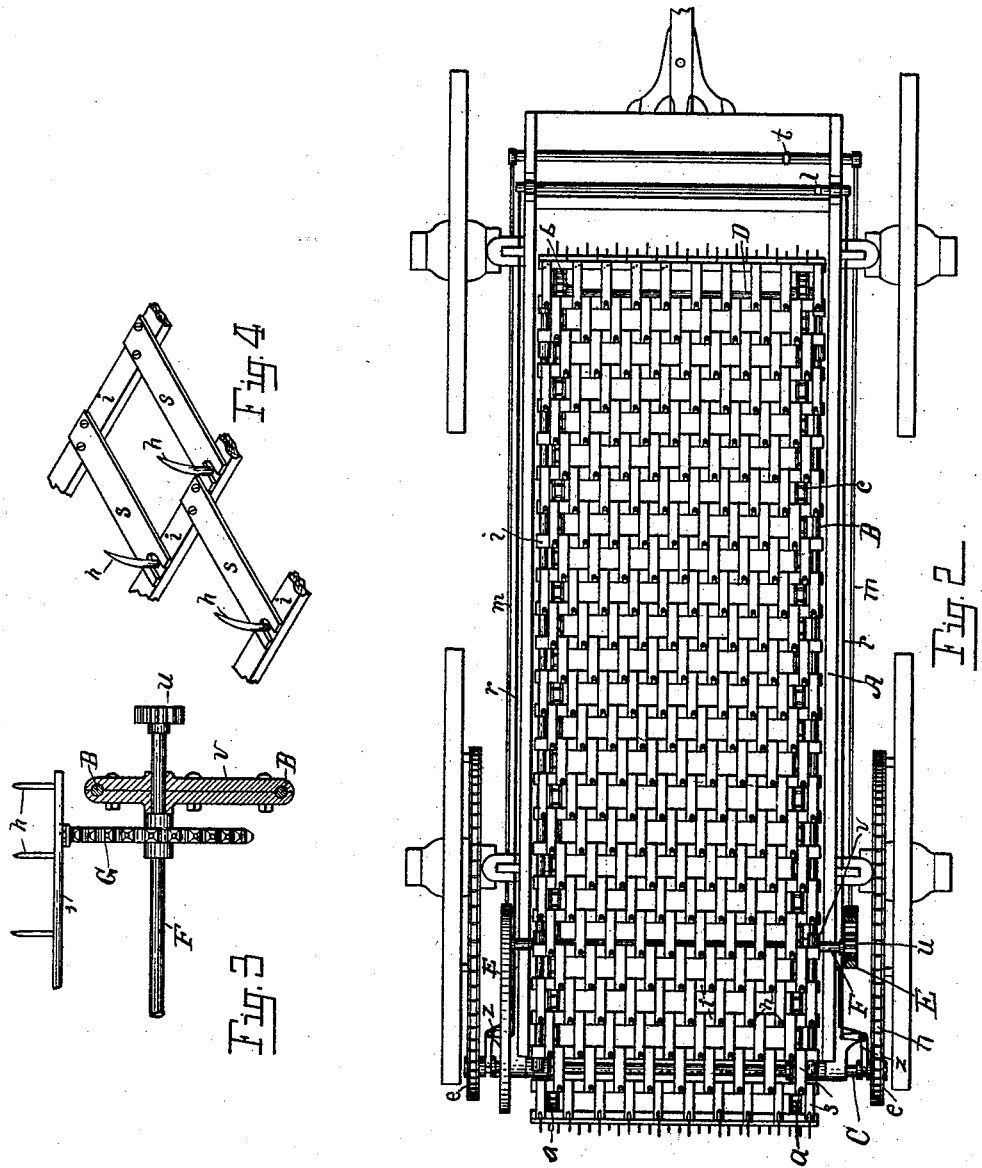
Witnesses:
Walter S. Wood
Newton G. Leslie
Inventor.
Benj. F. Rix
By Lucius C. West
Att'y.

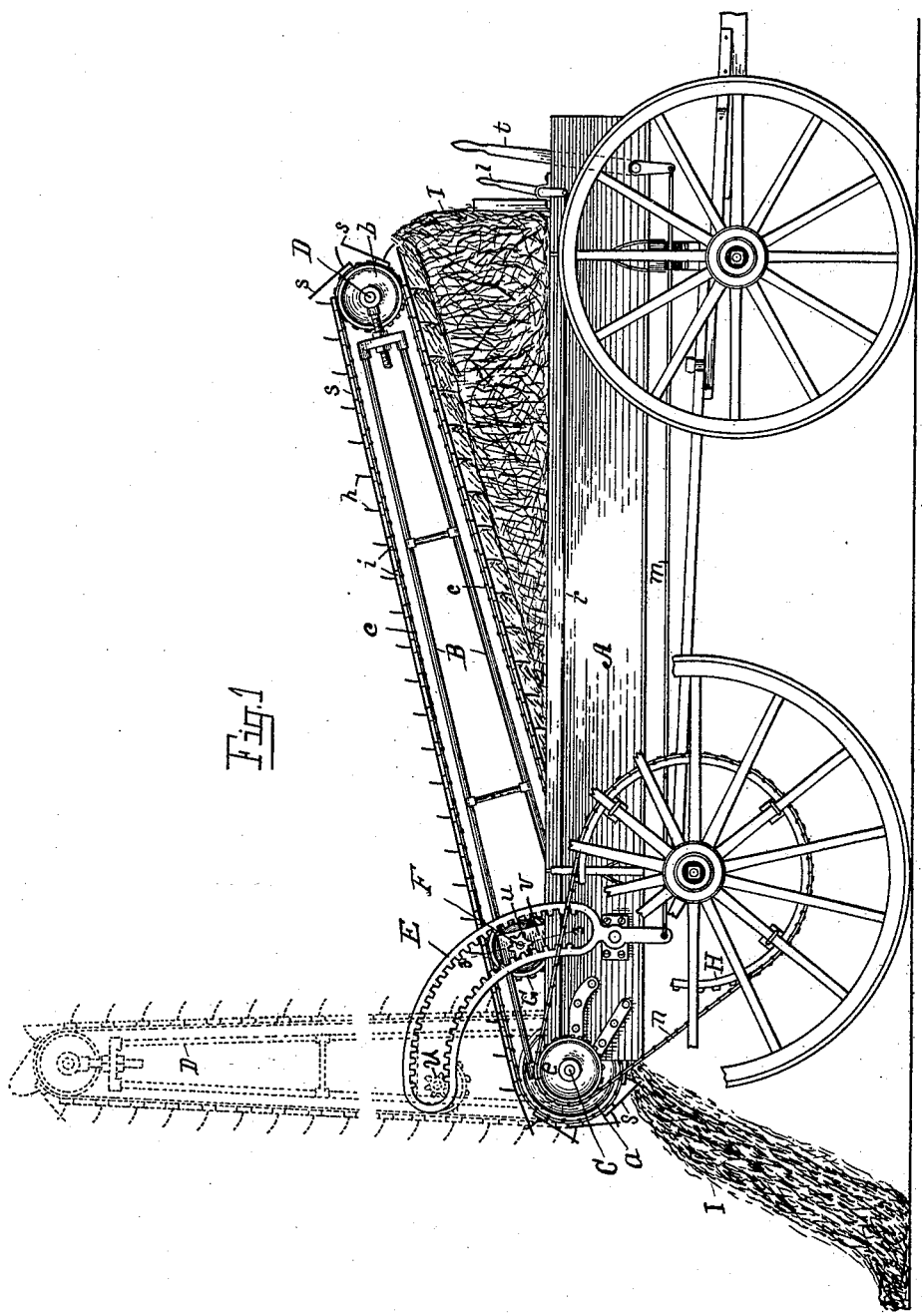

UNITED STATES PATENT OFFICE.

BENJAMIN F. RIX, OF KALAMAZOO, MICHIGAN.

FERTILIZER-DISTRIBUTER.

SPECIFICATION forming part of Letters Patent No. 488,680, dated December 27, 1892.

Application filed February 29, 1892. Serial No. 423,202. (No model.)

*To all whom it may concern:*

Be it known that I, BENJAMIN F. RIX, a citizen of the United States, residing at Kalamazoo, county of Kalamazoo, State of Michigan, have invented a new and useful Fertilizer-Distributer, of which the following is a specification.

This invention relates to machines so constructed that the traveling teeth which unload the fertilizer will engage the surface of the load and gradually lower as the load lowers, so as to always preserve the engagement of the teeth with the load until the latter is all distributed, by which means the load itself does not have to be moved as a whole in the vehicle box and the load may be piled up like a load of hay, if expedient, as, for instance, in cases of coarse manure.

The object of the invention is to provide the machine with mechanism for raising and lowering a frame which bears the teeth, in a manner that the movement of the belts which carry the teeth will operate said mechanism.

Another object is to provide the machine with cleaners for cleaning the teeth.

Other objects consist in operating and controlling devices; all as more particularly described and claimed below.

In the drawings forming a part of this specification Figure 1 is a side elevation; Fig. 2 a plan view of Fig. 1, Fig. 3 is an enlarged section on line 3—3 in Fig. 1, looking from a point at the left; Fig. 4 broken details in enlarged perspective from Figs. 1 and 2.

The mechanism of this machine may be attached to the box of any sort of a vehicle suitable for hauling fertilizer. Ordinarily it will be attached to the box of a wagon, A, in Figs. 1 and 2.

At B is shown a rectangular frame, pivotally attached to the rear end of the wagon box, A. This is so shown for convenience of illustration, but the frame may be pivotally attached to the side of the wagon box and unload from the side, instead of the rear, or it may be pivotally attached to any other desired portion of the box. This frame, B, is pivotally attached on a transverse shaft, C, so that said frame may be swung up to a vertical or any other angle, as indicated by the dotted position of said frame in Fig. 1, when loading, and be allowed to rest against the load and swing down with it, so as to allow the traveling teeth, $h$, borne by said frame, to always engage the fertilizer upon which the teeth are acting, as before stated, until the wagon box is emptied by said traveling teeth, as shown in Fig. 1.

Mounted upon the shaft, C, at each side of the box, A, at the rear end, are sprocket wheels, $a$, and mounted upon a transverse shaft, D, in the forward end of the frame B, are two sprocket wheels, $b$. These sprocket wheels carry traveling sprocket chains, $c$, one on each side of the frame B. Attached to these sprocket chains is a series of transverse slats, $i$, which slats bear the teeth or projections, $h$. Motion is imparted to these belts by means of sprocket chains, $n$, mounted upon sprocket wheels H, (attached to the vehicle wheels) and sprocket wheels $e$, mounted upon the ends of the shaft C. A lever, $l$, in Fig. 1, is connected by rods, $r$—$r$, to the bell cranks, $z$, of an ordinary clutch mechanism, which throws the shaft C in and out of gear, when wishing to start or stop the traveling teeth, as shown in Fig. 2. This may be accomplished by an ordinary clutch, which needs no description here, or by any other suitable means.

When loading the vehicle the frame, with its traveling teeth is raised to an upright angle on its pivot, as indicated in Fig. 1 by dotted position. It may be raised by hand, so far as my invention is concerned, or it may be raised by some suitable mechanism. So too, the frame with its traveling teeth may automatically swing down by gravity so that said traveling teeth will always engage the surface of the load until said load is entirely distributed, or it may be lowered by suitable mechanism, so as to control its movement, if it should be found necessary, to prevent an undue engagement of the teeth with the fertilizer.

The operation is illustrated in Fig. 1, where the fertilizer, I, is being discharged out of the rear end of the wagon box, by the teeth, $h$, which engage said fertilizer and rake it down off from the end of the wagon box from the upper surface of the load. The operation of unloading can commence when the frame and its teeth are at the upright angle shown in dotted position and gradually swing down as the load lowers, as before stated. The frame with its teeth will lower until the load is entirely unloaded, clear down to the bottom of the wagon box.

I have illustrated the mechanism for raising and lowering the frame, B, consisting of the slotted racks, E E, having cogs on the inner edges of their parallel bars, as shown in Fig. 1, the lower ends of said racks being pivoted to the wagon box and adapted to be oscillated by a lever, t, which is connected to the lower ends of said racks by rods, m m.

The frame B, is provided with a transverse shaft, F, having bearings in cross pieces, v, at the sides of the frame A. The ends of this shaft F, are provided with sprocket gears, G, Figs. 1 and 3, which gears engage the sprocket chain, c. The ends of the shaft F, are provided with a pinion, u. By means of this mechanism the racks E E, are so tilted by means of the lever t, that the pinions u, will engage the upper row of the cogs of the racks, E E, when wishing to raise the frame B to its upper position, which action would preferably take place just as the wagon gets back to its place of loading. Then by tilting the racks E E, so that the pinions u, will engage the lower row of the cogs of said racks, when desiring to commence unloading, the frame B, with its traveling teeth, will swing with a positive and controlled movement downward, as the load is being unloaded. In Fig. 1, the dotted pinion u, shows its position when the frame begins to swing down, and the position of the frame with its teeth in operation shows the said frame nearly down, with the load nearly unloaded. While this is deemed a practical plan for controlling the movements of the frame B, as indicated, I do not wish to be confined to any particular means. The important feature in this connection is to raise and lower the frame by any suitable mechanism operated by the movement of the traveling chains or belts which bear the teeth.

While the controlling and propelling mechanism above described are here shown on both sides of the machine, that on one side may be dispensed with, if desired, as also may one of the clutches on the end of the lever z.

It will be found of advantage in many instances to clean the teeth, h, before they strike in the fertilizer or after they leave it, and more especially in cases of barn manure quite freely mixed with straw. I have found a practical means for accomplishing this, by attaching to the transverse slats, i, which bear the teeth h, a series of forked strippers, s, as clearly indicated in Fig. 4 and also shown in Figs. 1 and 2. The forked free ends of these strippers, s, rest on the neighboring slats, i, and are astride of the teeth h, and since the slats bearing the teeth break over the sprocket wheels at the end of the frame B, they will tilt in a manner to throw the forked ends of the strippers s, off from said teeth and thereby free the teeth from anything which may have caught onto them; but, as indicated, the strippers will not always be needed, and this style or any other suitable style may be employed.

In lieu of sprocket wheels C and D and sprocket chains c, suitable pulleys bearing belts or cables may be employed, if deemed practicable; the idea which I wish to convey being that belts or cables may be employed, performing the same function as the sprocket wheels and chains.

Having thus described my invention, what I claim as new and desire to secure by Letters Patent of the United States is:

1. The combination of a suitable frame bearing traveling belts carrying teeth and adapted to be raised, and to move down against the surface of the load as the load is lowered by said traveling teeth, and suitable mechanism connected with said traveling belts, whereby the movement of said belts raises and lowers said frame; substantially as set forth.

2. The combination of a suitable frame bearing traveling belts carrying teeth, and adapted to move down against the surface of the load as said load is lowered, and suitable toothcleaners traveling with said teeth; substantially as set forth.

3. The combination of a suitable frame bearing traveling belts provided with teeth and adapted to be raised and to move down against the surface of the load, as said load is lowered by the traveling teeth, and a rack and pinion mechanism connected with said traveling belts, whereby the motion of said belts will raise and lower the frame; substantially as set forth.

4. The combination of a suitable vehicle, a frame pivoted at one end to said vehicle, said frame bearing at the ends sprocket wheels, sprocket chains carried by said sprocket wheels and transverse slats attached to said chains and bearing fertilizer distributing teeth, and means for operating the same, and the forked cleaners attached at one end to one of the tooth slats and astride of the teeth at the other end on the neighboring slat; whereby they will clean the teeth by tilting at the ends of the frame when the slats are carried around the sprocket wheels, substantially as set forth.

5. The combination of a suitable vehicle, a frame pivoted at one end to said vehicle, said frame bearing at the ends sprocket wheels, sprocket chains carried by said sprocket wheels and transverse slats attached to said chains and bearing fertilizer distributing teeth, and means for operating the same, a double rack, comprising the two parallel bars, having the cogs on the inner edge of each bar, said rack being pivoted to oscillate, said frame which bears the sprocket chains being provided with a transverse shaft having sprocket wheels engaging the said chain and said shaft being provided with a pinion engaging the oscillating rack during the upward and downward swing of said frame, substantially as set forth.

In testimony to the foregoing I have hereunto subscribed my name in the presence of two witnesses.

BENJAMIN F. RIX.

Witnesses:
H. E. TRUMBLE,
N. G. LESLIE.